T. D. STANLEY.
LOCK FOR STEERING WHEELS.
APPLICATION FILED AUG. 7, 1918.
1,354,630.
Patented Oct. 5, 1920.
2 SHEETS—SHEET 1.
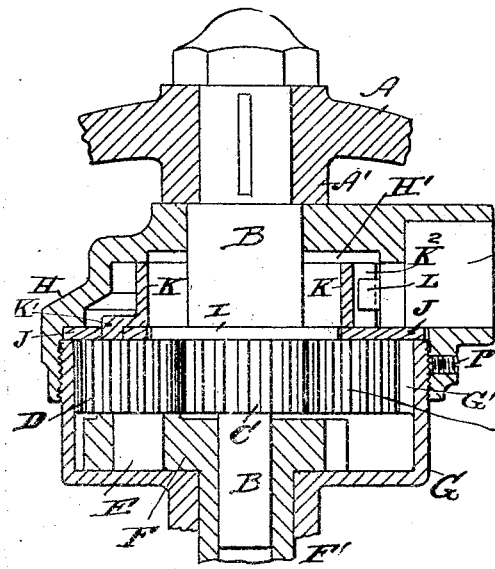
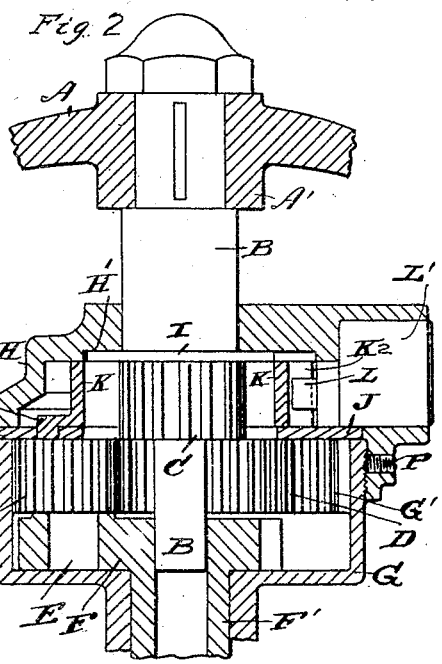
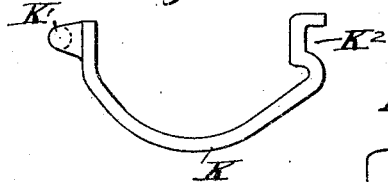
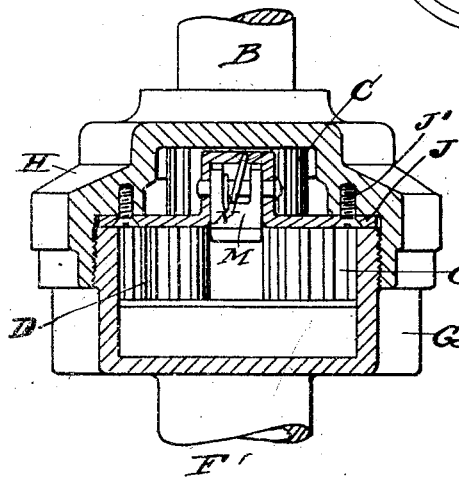
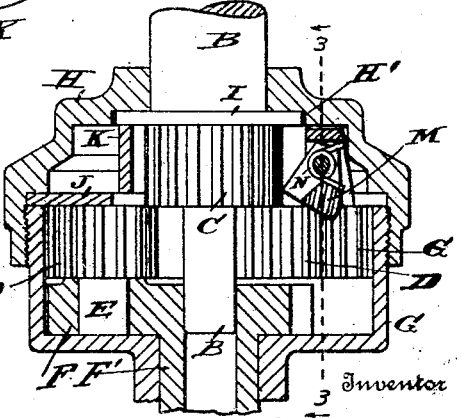
Inventor
Theodore D. Stanley
By
J. S. Thomas
Attorney

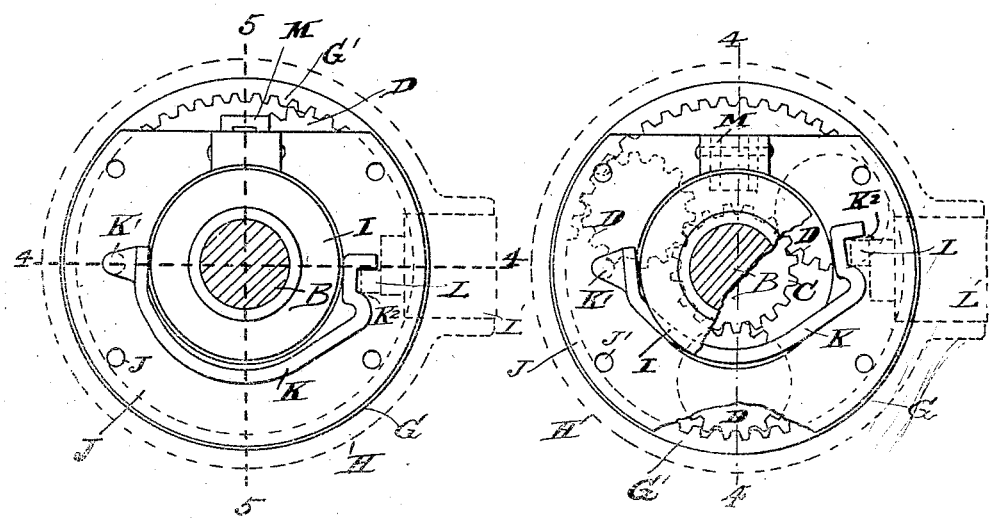
Fig. 7. Fig. 6.
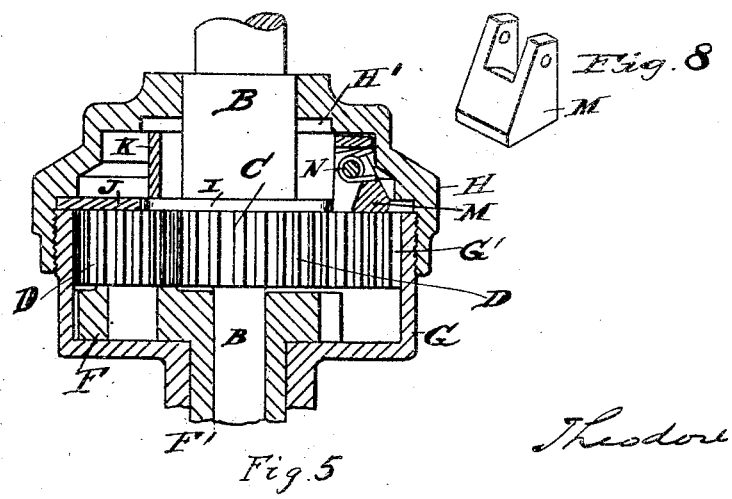
Fig. 8.
Fig. 5.

UNITED STATES PATENT OFFICE.

THEODORE D. STANLEY, OF DETROIT, MICHIGAN, ASSIGNOR TO LELAND LOCK COMPANY, OF DETROIT, MICHIGAN, A CORPORATION OF MICHIGAN.

LOCK FOR STEERING-WHEELS.

1,354,630.  Specification of Letters Patent.  Patented Oct. 5, 1920.

Application filed August 7, 1918. Serial No. 248,668.

*To all whom it may concern:*

Be it known that I, THEODORE D. STANLEY, citizen of the United States, residing at Detroit, county of Wayne, State of Michigan, have invented a certain new and useful Improvement in Locks for Steering-Wheels, and declare the following to be a full, clear, and exact description of the same, such as will enable others skilled in the art to which it pertains to make and use the same, reference being had to the accompanying drawings, which form a part of this specification.

This invention relates to a lock for the steering wheels of motor driven vehicles shown in the accompanying drawings and more particularly described in the following specification and claims.

The object of this invention is to temporarily render the steering wheel inoperative to guide the vehicle, whereby unauthorized persons may be unable to drive it during the absence of the owner;—the device being especially designed for controlling the steering mechanism of a "Ford" automobile. It is well known that the steering wheel of this type of car is provided with a stub shaft fitted with a pinion adapted to actuate a system of planetary gearing controlling the operation of the steering post;—the gearing being inclosed in a case located directly beneath the steering wheel and supported by the post.

In the present construction the steering wheel may be rendered inoperative to guide the vehicle by means adapted when actuated to sustain the pinion carried by the steering wheel out of mesh with the planetary gearing controlling the operation of the steering post;—said means being also adapted to maintain the pinion in an operative relation to the planetary gearing when the owner or an authorized person desires to drive the vehicle.

The present invention also provides means to prevent the removal of the cover plate fitted to the gear case in order that no maliciously inclined persons may tamper with the inclosed gearing in an attempt to restore said gearing to a condition whereby the steering wheel may control the direction of the vehicle.

In putting these several matters into effect, one of the objects of the invention is to provide a device simple in its operation and inexpensive to manufacture and which may be readily installed by the owner of the vehicle without the necessity of employing skilled labor.

With the foregoing and other objects in view which will appear as the description proceeds, the invention resides in the combination and arrangement of parts and in the details of construction hereinafter described and claimed, it being understood that changes may be made in the precise embodiment of the invention herein disclosed without departing from the spirit of the same.

In the accompanying drawings forming part of this specification:—

Figure 1 is a vertical sectional view through a fragment of a steering wheel and post, showing the pinion of the steering wheel in operative relation with the coacting planetary gearing of the post.

Fig. 2 is a similar sectional view, showing the steering wheel with its pinion raised to an inoperative position with respect to the planetary gearing of the post.

Fig. 3 is a vertical sectional view through the planetary gear case on line 3—3 of Fig. 4.

Fig. 4 is a vertical sectional view on line 4—4 of Fig. 6.

Fig. 5 is a vertical sectional view on line 5—5 of Fig. 7, showing the steering wheel in operative relation to the steering post and indicating the latch controlling the removal of the cover from the gear case forced back against the action of its spring, due to the pressure of the washer carried by the stub shaft of the steering wheel, and so that the planetary gears may function normally for the proper control of the vehicle;—the view also showing the locking latch above the washer to secure the pinion against accidental release from its operative relation with the planetary gears.

Fig. 6 is a plan view of the gear case with the cover removed,—but indicated in dotted lines, and with parts broken away and in section—showing the locking arm, actuated by the key controlling unit, (also indicated by dotted lines) beneath the washer carried by the stub shaft, whereby the steering wheel is supported in its elevated or released relation to the steering post.

Fig. 7 is a similar view showing the locking arm thrown by the key so that the pinion carried by the stub shaft of the steering wheel may be released from its elevated disengaged relation to the steering post to Fig. 8 is a detail perspective view of the spring actuated latch controlling the removal of the gear case cover.

Fig. 9 is a plan view of the locking arm.

Referring now to the letters of reference placed upon the drawings:—

A denotes a steering wheel and A' its hub keyed to a stub shaft B. C indicates a pinion carried by the stub shaft in mesh with a plurality of gears D, carried upon studs E, secured to a plate F, at the top of the post F' into which the lower end of the stub shaft extends. G is a gear case having an internal gear G' on its inner periphery with which the gears D are in mesh. The foregoing is the usual "Ford" steering wheel assembly and as its construction and operation are well known and understood it will need no further explanation.

H denotes an annular cover screwed upon the gear case G adapted to receive the pinion C, when manually lifted out of mesh with the gears D, by the steering wheel A. I is a washer carried by the stub shaft directly above the pinion C, and when the gear is lifted out of mesh with its coacting planetary gears, is lodged in a recess H' in the gear case cover H. J is an annular washer secured by screws J', to a shoulder formed on the cover H; the washer being adjacent to the gears D when the cover is screwed in position upon the gear case. K is a swinging arm of substantially arc-shaped form, pivoted at K', to the washer J. The free end of the swinging arm is formed with a recess K², to receive the rocking pin L, of a suitably key-controlled locking unit L', supported in the wall of the cover H. The swinging arm K is adapted to close over the washer I to maintain the pinion C in mesh with the gears D, when the steering wheel is in position to operate the steering post F';— and it is also adapted to be swung under the washer, to support the pinion C and steering wheel A, in a free or released relation with respect to the operation of the steering post. M is a swinging latch pivoted between the walls of a struck-up portion of the annular washer J. N is a spring mounted upon the pin on which the latch is pivoted adapted to tilt the latch downwardly between the gears D upon the steering wheel being raised to its released position with reference to the control of the steering post.

P, is a set screw to secure the cover H to the gear case against accidental rotation under normal conditions.

Having now indicated the several parts by reference letters, the construction and operation of the device will be readily understood.

To render the steering wheel inoperative for the purpose of actuating the steering post F', the key controlled locking unit L' is operated to rock the pin L by which the swinging arm K is shifted so as to permit the pinion C to be manually raised by means of the steering wheel out of mesh with the planetary gears D by which the steering post is actuated. Upon the washer I entering the recess H' of the cover, the swinging arm K is again operated by the key controlled unit L' so as to swing beneath the washer, thus supporting the pinion in its disengaged relation to the planetary gears D, controlling the operation of the steering post. The washer I having been raised to the position indicated in Fig. 4, the spring actuated latch M is free to swing down between the gears D, its rocking movement being limited by the inclined upper wall M' contacting with struck-up portion J', of the annular washer J.

It will now be readily understood that the cover H, cannot be unscrewed from the gear case G while the spring latch M is projected between the gears D, housed in said case;— thus a maliciously inclined person would be unable to remove the cover for the purpose of attempting to operably connect the steering wheel with the post that the vehicle may be driven away.

It will be noted that when the pinion C is manually lowered by means of the steering wheel into mesh with the gears D, that the washer I will serve to force the latch M, against the action of its controlling spring from between the gears D, that the latter may function normally.

Having thus described my invention what I claim is:—

1. In a device of the character described, the combination of a steering post fixed against lengthwise movement, a gear housing carried by the post, a planetary gearing in said housing, a cover secured to said housing, a steering wheel supported by a stub shaft adapted for lengthwise movement with reference to the steering post, a pinion fixed to the stub shaft, an arc shaped laterally swingable arm having one end pivoted in the housing and the other free, and key operated means for actuating said arm to maintain the pinion in meshed and also in demeshed relation to the planetary gear.

2. In a device of the character described, the combination of a steering post fixed against lengthwise movement, a gear housing carried by the post, a planetary gearing in said housing, a cover screwed to the gear housing, a steering wheel supported by a stub shaft adapted for lengthwise movement with reference to the steering post, a pinion fixed to the stub shaft, a projecting flange located adjacent to the pinion, an arc shaped laterally swingable arm having one end pivoted in the housing and the other free, the free end of said arm being notched, a key operated means carried by the housing, and said means being coöperatively connected with the notched end of the arm to actuate the same, whereby it is adapted to either overlap the flange of the pinion to maintain the pinion in meshed relation with the planetary gearing or to be projected under the flange to support the pinion in demeshed relation to the planetary gear.

3. In a device of the character described, a steering post fixed against lengthwise movement, a gear housing supported by the post, a planetary gearing in said housing, a cover screwed to the gear housing, a steering wheel supported by a stub shaft adapted for lengthwise movement with reference to the steering post, a pinion fixed to the stub shaft, means for maintaining the pinion in meshed or demeshed relation to the planetary gearing, an annular washer secured to the cover, a spring actuated latch pivoted to the washer adapted to enter the gear housing between the gears, whereby the cover may be secured against unauthorized removal from the gear housing.

4. In a device of the character described, the combination of a steering post fixed against lengthwise movement, a gear housing carried by the post, a planetary gearing in said housing, a cover screw-threaded to the gear housing, a steering wheel supported by a stub shaft adapted for lengthwise movement with reference to the steering post, a pinion fixed to the stub shaft, a projecting flange located adjacent to the pinion, an annular washer secured to the cover, a swinging arm pivoted to the washer, adapted to overlap or underlap said flange, whereby the pinion may be maintained in meshed or demeshed relation to the planetary gearing, and a spring actuated latch pivoted to the annular washer and under the control of said projecting flange, adapted to enter the gear housing between the gears, whereby the cover may be secured against unauthorized removal.

5. In a device of the character described, a steering post, a gear housing supported by the post, a planetary gearing in said housing, a cover screwed to the gear housing, a steering wheel supported by a stub shaft, a pinion fixed to the stub shaft adapted to be brought into meshed or demeshed relation with the planetary gearing by the manual raising or lowering of the steering wheel, means for maintaining said pinion in meshed or demeshed relation with the planetary gearing, an annular washer secured to the cover of the gear housing, a spring actuated latch pivoted in the wall of the annular washer adapted to enter the gear housing between the gears, to secure said cover against unauthorized removal from the gear housing, means for limiting the movement of the latch, and means carried by the stub shaft adapted to control the operation of said latch, whereby said latch may be allowed to enter the gear case upon the steering wheel being raised to release the wheel from operative control of the steering post, and to force said latch from the gear case when said wheel is again brought into operative control of the steering post.

6. In a device of the character described, a steering post fixed against lengthwise movement, a gear housing supported by the post, a planetary gearing in said housing, a removable cover for said housing, a steering wheel supported by a stub shaft adapted for lengthwise movement with reference to the steering post, a pinion fixed to the stub shaft, means for maintaining the pinion in meshed or demeshed relation to the planetary gear, a bolt adapted to enter between the planetary gears to prevent their rotation, whereby the cover of said case may be secured against removal, and means actuated by the alternate reciprocating movement of the stub shaft for controlling the operation of the bolt, whereby it may project into said gear case or be withdrawn therefrom.

7. In a device of the character described, the combination of a steering post fixed against lengthwise movement, a gear case carried by said post, a removable cover for said case, a steering wheel supported by a stub shaft adapted for lengthwise movement with reference to the steering post, planetary gear housed in the case for operably connecting the stub shaft with the steering post, means for maintaining the stub shaft and steering wheel in operative or in inoperative relation to the steering post, and means actuated by the alternate reciprocatory movement of the stub shaft for securing the cover of the gear case against removal when the pinion is in demeshed relation to the planetary gearing.

8. A lock for the steering mechanism of a vehicle, comprising a removable cap member adapted for attachment to said mechanism, a shaft slidable within said member into and out of engagement with said steering mechanism, a collar carried by said shaft for limiting its sliding movement, a locking bolt mounted in the cap normally projecting into locking engagement with the steering mechanism, and a lever pivoted in said cap and having arms coöperating respectively with said collar and locking bolt whereby the sliding movement of the shaft automatically locks the cap to the steering post and releases it therefrom.

In testimony whereof, I sign this specification in the presence of two witnesses.

THEODORE D. STANLEY.

Witnesses:
L. E. THOMAS,
JOHN CONSIDINE, Jr.